Patented Dec. 12, 1944

2,365,097

UNITED STATES PATENT OFFICE 2,365,097

METHOD OF PREPARING PAPER COATING COMPOSITIONS AND THE LIKE

Harold R. Murdock, Asheville, N. C., assignor to The Champion Paper and Fibre Company, Hamilton, Ohio, a corporation of Ohio No Drawing. Application August 13, 1941, Serial No. 406,731

7 Claims. (Cl. 106—214)

This invention relates to a process of preparing paper coating compositions containing pulverized rice or rice flour. More specifically it relates to the treatment of inferior grades of rice to produce a rice flour product substantially free of deleterious contaminants and which is suitable as a paper coating adhesive.

Crude rice as it comes from the fields contains a certain amount of small black or dark colored so-called "weed seeds" and many of these are found in the "brown" rice after the rice hulls have been removed, and also in the "polished" or white rice. These seeds must be completely removed from rice sold for table use, since they are extremely conspicuous and otherwise objectionable even when present to a very small percent. These seeds being smaller than the whole grains of rice, either "brown" or "polished," are easily removed along with the broken rice grains.

The weed seeds, however, cannot be separated from the broken rice grains by any screening or other simple mechanical operation, and the methods of separation heretofore proposed are too expensive to be practical. That is to say, the expense of separating the weed seeds from the broken rice adds so much to the cost of the broken rice that it is not marketable in competition with the whole rice, and broken rice is commonly sold containing the weed seeds and at a much lower price than the whole rice.

For industrial use, or for any use where appearance does not count and the grain size is unimportant, broken rice free of weed seeds serves every purpose quite as well as the whole rice from which the broken grains and the weed seeds have been separated. For paper coating compositions, the rice is finely ground and rice flour produced from broken grains cannot be distinguished from the rice flour produced from whole grains unless there are weed seeds present with the broken rice grains, and the principal object of the present invention is to provide a simple, cheap and expeditious process for treating rice containing weed seeds, particularly dehulled broken rice containing a high percentage of weed seeds resulting from the production of polished rice, to produce a rice flour which is substantially free from deleterious contaminants and which is suitable for use in paper coating compositions.

Another object of the invention is to provide a method of separating weed seeds from rice during the preparation of the rice flour for incorporation in the paper coating composition, thereby substantially eliminating any added cost for separation of the weed seeds and in effect making it practical to use inexpensive broken rice contaminated with weed seed in lieu of the much more expensive whole rice to produce paper of equal quality without significant additional processing cost.

I have found that if rice grains either whole or broken containing the weed seeds naturally associated with crude rice are treated with water a differential softening of these ingredients takes place; also, when this aqueous slurry of rice and weed seeds is subjected to the action of a ball or pebble mill the rice grains are rapidly reduced to a fine state of subdivision whereas the weed seeds resist the grinding action to a marked degree. Apparently the hulls of the weed seeds are quite tough. Although the seeds as a whole are frequently observed to have been crushed in the action so that the pulp or inner portions of the seeds are often separated from the hulls and reduced to a fine state of subdivision, the hulls themselves withstand the grinding action to a surprising extent. This bursting of the weed seeds which may occur and the consequent crushing and grinding of the inner portions of the seeds are not disadvantageous to the process since the inner portions of these seeds are in general colorless or of a light color and their somewhat sticky or glutinous contents may add slightly to the adhesive properties of the product. After the rice grains have reached the desired degree of fineness the grinding is discontinued and the product is run over a screen. In this way the pulverized rice is very readily separated from the tough black hulls or undisintegrated whole weed seeds.

Prolonged or excessively severe grinding in the ball mill tends to comminute the seed hulls which may pass through the screen along with the pulverized rice and eventually show up in the coated paper as objectionable black specks. However, the wet rice grains are so easily disintegrated by the ball mill operation that it is a simple matter to determine just what degree of grinding is required to adequately pulverize the rice particles without substantial disintegration of the seed hulls.

The resulting product from the above described wet grinding and screening operations is a slurry of finely pulverized rice flour of good color and substantially free from deleterious contaminants. It may be then mixed with pigments such as clay, calcium, carbonate, etc., and additional water if desired to produce a coating composition that may be applied to paper and the freshly coated paper subjected to a steaming or cooking operation; or a relatively dilute aqueous suspension of the product may be cooked to gelatinize the starch present in the flour and thus develop its adhesive properties; or the rice flour suspension may first be treated with an enzyme to reduce the viscosity of the cooked rice flour.

The step of separating the seeds and seed hulls need not be performed immediately after the milling operation, but may take place at any stage of the subsequent procedure where the seeds and seed hulls are still intact.

In place of treating the rice containing weed seeds with water alone, a dilute alkaline solution may be employed to hasten the softening of the rice grains. Thus I find that treatment of the raw material with a dilute caustic solution (.1 to 1% sodium hydroxide solution) softens the rice grains very quickly but does not materially soften the weed seeds. This difference in effect between the rice and the weed seeds is so great that it is not necessary to employ as strenuous a disintegration as is effected by a ball mill operation. In fact, the disintegration of the rice occurs with mere agitation of the material. After the disintegration of the rice grains the product is screened as above described.

If desired, the crude rice containing the weed seeds may be mixed with water and the coating pigment that is to be used in the coating composition, and the whole mixture ground in a ball mill. Thereafter the resulting mixture is screened. According to this modification of the invention the rice grains are pulverized and simultaneously mixed with the pigment and this combined operation in no way renders the subsequent screening out of the weed seeds or weed seed hulls more difficult.

The following examples are given to further illustrate the invention:

(1) 5000 pounds of broken rice contaminated with weed seed in 7500 pounds of water, were ground in a pebble mill for two hours. The ball mill had a total capacity of 1500 gallons and about one-half the space in the ball mill was occupied by flint pebbles. The pulverized rice was drawn from the ball mill, passed over a 120-mesh screen and mixed with coating clay in the proportions of 1000 pounds of clay to 450 pounds of rice slurry (180 pounds dry basis) and water to give a total solids of about 52%. This was applied to the paper and the freshly coated paper was run through a steam box to gelatinize the starch present in the rice, thereby developing adhesiveness necessary to bond the pigment to the paper.

(2) 1000 pounds of broken rice containing weed seeds was ball milled for one and one-half hours in a 300-gallon capacity ball mill in the presence of 1000 pounds of water. Then 500 pounds of water were added and the ball milling continued for another half hour. The material was drawn from the ball mill, screened through an 80-mesh screen and was then cooked and treated with diastasic enzyme to reduce the viscosity of the solution. After cooling, a coating mixture was prepared consisting of

| | Parts |
|---|---|
| Clay | 75 |
| Calcium carbonate | 25 |
| Rice (dry basis) | 23 | and enough water to give a total solids of 38%. These ingredients after being thoroughly mixed together produced a coating composition suitable for making a good grade of coated printing paper.

(3) 1000 pounds of coating clay, 200 pounds of broken rice containing weed seeds, and 1600 pounds of water were ball milled for two hours. The contents were discharged through a 100-mesh vibrating screen. The undisintegrated weed seeds and weed seed hulls were caught on the screen, and that which passed through the screen was applied to paper and cooked on the paper, passing the freshly coated paper through a steam box to heat the paper to 180° F. and thereby gelatinize the starch content of the rice.

It will be understood that the above are but typical examples of coating procedures wherein the process of this application is used to advantage. It will also be understood that the aqueous suspension of ground rice particles from which the seeds and seed hulls have been screened may be dried and stored for later use in paper coating processes such as above described. Also, of course, the ground rice particles from which the weed seed and hulls have been removed may be further processed to produce other starch products such as the so-called "treated starch" heretofore chiefly made from corn starch and potato starch.

Particularly, it will be understood that the invention is not limited to the foregoing specification and examples, except insofar as set forth in the appended claims.

In the appended claims the expression "high percentage of weed seeds" means high percentage in comparison with the percentage of weed seeds present in the rice before screening to remove the broken rice, and does not mean a percentage which is high in comparison with the percentage of rice product in the material processed.

I claim:

1. In a process of preparing paper coating compositions comprising an aqueous suspension of mineral pigment and an adhesive derived from rice, the steps which include subjecting dehulled broken rice resulting from the production of polished rice and containing a high percentage of weed seeds to a mechanical disintegrating action in the presence of water until the rice particles are reduced to the state of a powder without the dark fibrous parts of the weed seeds being substantially disintegrated, and separating said dark fibrous parts of the weed seeds from the powdered rice.

2. In a process of preparing paper coating compositions comprising an aqueous suspension of mineral pigment and an adhesive derived from rice, the steps which include subjecting dehulled broken rice resulting from the production of polished rice and containing a high percentage of weed seeds to a mechanical disintegrating action in a ball mill in the presence of water under such conditions and for such length of time that the rice particles are reduced to the state of a powder without the dark fibrous parts of the weed seeds being substantially disintegrated, and separating said dark fibrous parts of the weed seeds from the powdered rice.

3. The process of preparing paper coating compositions which comprises subjecting dehulled broken rice resulting from the production of polished rice and containing a high percentage of weed seeds to a mechanical disintegrating action in the presence of water until the rice particles are reduced to the state of a powder without the dark fibrous parts of the weed seeds being substantially disintegrated, mixing the powdered rice with mineral pigment, and separating the dark fibrous parts of the weed seeds from the mixture of powdered rice and mineral pigment.

4. The process of preparing paper coating compositions which comprises subjecting dehulled broken rice resulting from the production of polished rice and containing a high percentage of weed seeds to a mechanical disintegrating action in a ball mill in the presence of water and a mineral pigment under such conditions and for such length of time that the rice particles are reduced to a state of powder, which is intimately mixed with the mineral pigment present, without the dark fibrous parts of the weed seeds being substantially disintegrated, and separating said dark fibrous parts of the weed seeds from the mixture of powdered rice and mineral pigment.

5. The process of preparing paper coating compositions which comprises subjecting dehulled broken rice resulting from the production of polished rice and containing a high percentage of weed seeds to a mechanical disintegrating action in the presence of water until the rice particles are reduced to the state of a powder without the dark fibrous parts of the weed seeds being substantially disintegrated, separating said dark fibrous parts of the weed seeds from the powdered rice, and mixing the remaining powdered rice with mineral pigment.

6. In a process of preparing paper coating compositions comprising an aqueous suspension of mineral pigment and an adhesive derived from rice, the steps which include subjecting dehulled broken rice resulting from the production of polished rice and containing a high percentage of weed seeds to the action of a dilute alkaline solution to soften and partially disintegrate the rice particles, continuing the disintegration of the rice particles by a mechanical disintegrating action until the rice particles are reduced to the state of a powder without the dark fibrous parts of the weed seeds being substantially disintegrated, and separating said dark fibrous parts of the weed seeds from the powdered rice.

7. In a process of preparing paper coating compositions comprising an aqueous suspension of mineral pigment and an adhesive derived from rice, the steps which include subjecting dehulled broken rice resulting from the production of polished rice and containing a high percentage of weed seeds to a mechanical disintegrating action in the presence of water until the rice particles are reduced to the state of a powder without the dark fibrous parts of the weed seeds being substantially disintegrated, and converting the starch in the remaining rice powder to a condition in which a solution thereof has a reduced viscosity by subjecting the rice powder in water to the action of disastasic enzymes.

HAROLD R. MURDOCK.